March 2, 1954     H. C. CUSKIE     2,670,812
SHOCK ABSORBER Filed March 30, 1950     4 Sheets-Sheet 1

INVENTOR.
Herman C. Cuskie.
BY
Harness & Harris
ATTORNEYS

March 2, 1954   H. C. CUSKIE   2,670,812
SHOCK ABSORBER
Filed March 30, 1950   4 Sheets-Sheet 2

INVENTOR.
Herman C. Cuskie.
BY
Harness & Harris
ATTORNEYS

March 2, 1954  H. C. CUSKIE  2,670,812
SHOCK ABSORBER
Filed March 30, 1950  4 Sheets-Sheet 3

INVENTOR.
Herman C. Cuskie.
BY
Harness & Harris
ATTORNEYS.

March 2, 1954

H. C. CUSKIE 2,670,812

SHOCK ABSORBER

Filed March 30, 1950

INVENTOR.
Herman C. Cuskie.
BY
Harness & Harris
ATTORNEYS.

Patented Mar. 2, 1954

2,670,812

UNITED STATES PATENT OFFICE 2,670,812

SHOCK ABSORBER

Herman C. Cuskie, Birmingham, Mich., assignor to Chrysler Corporation, Highland Park, Mich., a corporation of Delaware Application March 30, 1950, Serial No. 152,817

6 Claims. (Cl. 188—88)

This invention relates to shock absorbers, and more particularly to improvements in hydraulic shock absorbers of the direct acting telescopic type commonly employed to control relative movement between the sprung and unsprung masses of a motor vehicle.

It is an object of my invention to provide a shock absorber which will function to provide improved riding comfort relative to ride characteristics of presently known shock absorbers used for example on passenger automobiles, trucks, and buses. In addition, my shock absorber provides a smoother, steadier ride with improved vehicle stability and safety over all types of roads.

Another object is to provide a shock absorber having improved simplicity of construction and assembly such that my shock absorber may be manufactured at relatively lower cost. Furthermore, my shock absorber has improved durability whereby it will perform efficiently in normal service over longer periods of use than is experienced with conventional shock absorbers.

A further object is to provide an improved method of hydraulic damping wherein the liquid medium is utilized with improved efficiency and effectiveness in controlling relative movements between the wheels and body of a motor vehicle for example.

Another object in the more limited aspects of my invention is to provide fluid conducting means for controlling damping action of the shock absorber, the fluid conducting means being so arranged as to baffle reservoir fluid and prevent such fluid from tendency to surge and pick up air particles.

Heretofore it has been customary in direct acting shock absorbers of the direct acting type to provide damping for the compression and rebound movements by means of thin-plate orifices with associated pressure relief valves. Resistance to movement of fluid is induced by relative movements of the piston and cylinder and commonly employs a velocity damping action which, generally speaking, is proportional to the square of the piston velocity or some power substantially greater than one. Under such conditions the shock absorber resistance builds up rapidly to reach its maximum resistance immediately after the beginning of its stroke as determined by a conventional blow-off type of pressure relief valve, such maximum resistance remaining approximately constant throughout most of the stroke and then decreasing abruptly just prior to the end of the stroke when the reduced piston velocity allows the blow-off relief valve to again close under the rapidly diminishing pressure of the fluid subjected to movement of the piston. Such arrangements introduce harshness in the ride and jolting of the passengers.

A typical example of a conventional type of shock absorber which is referred to herein in contrast with my shock absorber is shown on pages 140 and 141 of "Chrysler 1940 Shop Manual" (D-8637), copyright 1940 by Chrysler Corporation, and also on pages 111 and 112 of "De Soto 1940 Shop Manual" (D-8636), copyright 1940 by Chrysler Corporation.

In addition, with the aforesaid prior shock absorbers, approximately the same maximum resistance is attained in the shock absorber regardless of the velocity of piston movement for all degrees of shock absorber actions which open the blow-off valve. Hence the resistance developed by the shock absorber and the damping performed is not proportioned or effectively related to the velocity of the piston stroke either on the compression jounce stroke or on the rebound stroke. Such arrangements and methods of damping forces are inefficient and impose undesired limitations on speed, safety, and comfort in driving motor vehicles over varying types of roads, especially those having washboard surfaces, chuckholes, gravel irregularities, or other deviations from the so-called smooth boulevard surfaces.

Among other objections to the aforesaid prior shock absorbers are difficulty in calibrating the blow-off valves, noisy action of such valves especially under low temperature conditions experienced in winter, and an undesirably long period of time in warming-up the oil in the shock absorber before reaching average normal conditions.

My invention has among its objects overcoming the aforesaid undesirable characteristics in conventional shock absorbers. In contrast with prior devices, I employ a novel method and means for effecting damping with improved efficiency and passenger comfort by utilizing viscous flow control preferably on both the compression and rebound strokes of the shock absorber. Viscous damping, as distinguished from conventional orifice or velocity damping, provides resistance to piston movement which varies, generally speaking, directly with piston velocity as a linear first power relation.

By reason of my viscous damping control the resistance developed by the shock absorber and the damping performed is proportioned and effectively related to the piston stroke velocity preferably on both the compression and rebound strokes. Instead of employing a damping action in which under all road conditions, excepting boulevards where the shock absorber is relatively inactive, the damping resistance rises rapidly to a peak which is then maintained over most of the piston stroke, my viscous damping provides a resistance which builds up smoothly and uniformly to a maximum corresponding to maximum piston velocity at substantially the mid-stroke of the piston and then falls off uniformly as the piston reaches the end of its stroke. This pattern of performance for my shock absorber is obtained for varying road conditions and for both of the compression and rebound strokes, the value of maximum resistance developed by the shock absorber being greater as the maximum piston velocity increases and in direct proportion to such increases. Thus the performance characteristics of my shock absorber for boulevard types of roads are fundamentally the same as those experienced on roads of varying degrees of roughness, the amount of resistance developed by the shock absorber automatically responding to varying piston velocities induced by the forces imposed on compression and rebound strokes and at all times the resistance developed is free from abrupt variations which result from use of conventional blow-off valves or other means for bringing about abrupt changes in rate of increase or decrease of pressure of the fluid in the shock absorber and resulting abrupt changes in resistance.

An additional object of my invention is to improve the efficiency of direct acting telescopic shock absorbers. One characteristic of my shock absorber directed to the attainment of this object resides in a method and means of damping which utilizes a principle of additional displacement of the piston on the compression stroke for effecting the damping action whereby, in contrast with prior practice aforesaid, I obtain increased resistance in my shock absorber at fluid pressures formerly employed, the sizes of the shock absorbers under comparison being the same. Because of this and other novel features characterizing my shock absorber, undesired excessive peak pressures are not developed and at the same time oscillating tendencies between the vehicle body and wheels are damped with such smoothness and effectiveness that static conditions are restored in substantially less time than heretofore and with improved comfort to the vehicle passengers.

Further objects and advantages of my invention will be more apparent from the following description of one embodiment thereof which serves to illustrate the principles involved, reference being made to the accompanying drawing in which.

Figure 1:
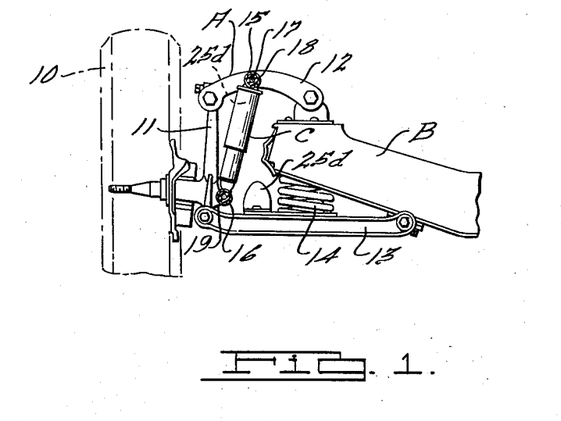
Fig. 1 is a diagrammatic elevational view of a typical vehicle front wheel suspension incorporating my shock absorber.
Figure 2:
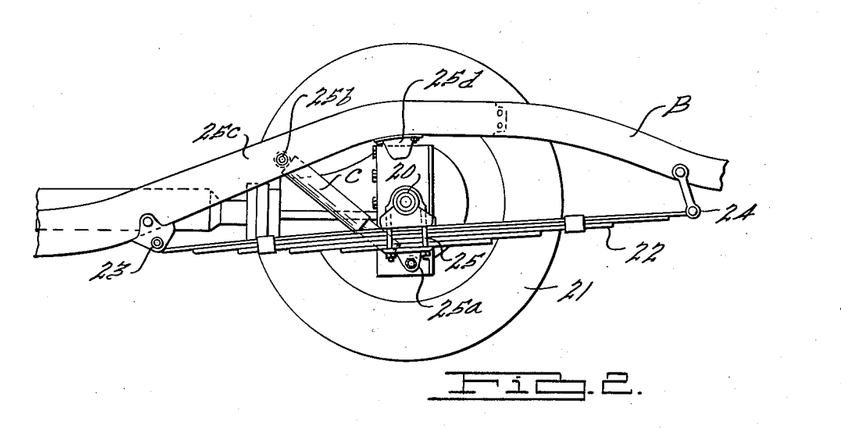
Fig. 2 is a similar view of a typical rear wheel suspension with my shock absorber.
Figure 2A:
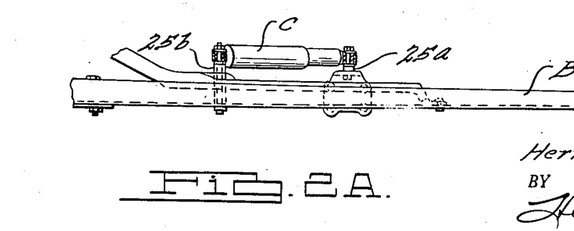
Fig. 2A is a detail plan view of the Fig. 2 rear suspension.

Referring to the drawings, I have shown my shock absorber applied to a typical vehicle front suspension in Fig. 1 and to a typical rear wheel suspension in Fig. 2, both of generally known geometry. My shock absorber may be used to advantage with any type of wheel suspension and, in its broader aspects, with other mechanisms and devices wherein damping of relatively movable bodies is desired. In applying my shock absorber to motor vehicles, it is only necessary to operably connect the opposite ends of the telescopic assembly respectively to two parts of the vehicle, one part moving in response to rise and fall of the ground wheel and the other part moving in response to rise and fall of the body or frame such that relative movement between the parts is under damping control by the shock absorber.

In Fig. 1 a typical steerable front ground wheel 10 is steerably supported on the upright knuckle support arm 11 of an independently sprung system A of generally conventional character having upper relatively short control arm 12 and lower relatively long control arm 13. Each control arm has its inner end pivotally mounted on the frame B of the vehicle and its outer end pivotally connected to one end of the arm 11. A coil spring 14 is positioned between the frame B and lower control arm 13 and serves, in conjunction with additional springing for the remaining wheels, to yieldingly support the vehicle body on the ground wheels.

My shock absorber C comprises an assembly of tubular parts having operating loops or eyes 15 and 16 at its opposite ends. These eyes may be mounted one on the vehicle frame B and the other on either of the control arms 12 or 13 or at other points for effecting the desired damping control. In Fig. 1 the eye 15 is mounted by a stud 17 to the upper control arm 12, a rubber bushing 18 being disposed between the eye and stud. A similar stud and rubber bushing mounts eye 16 to an inwardly extending boss portion of the knuckle support arm 11 adjacent the lower end thereof as generally indicated at 19. In this particular arrangement it will be apparent that relative movements between frame B and wheel 10 will be accompanied by movement of the shock absorber eyes 15 and 16 either toward or away from one another, the illustrated geometry being such that approximately 2.7″ wheel movement will cause 1″ of "shock absorber movement" by which I mean 1″ of movement of the eyes toward or from each other. My invention is, of course, in no sense limited to any particular ratio of wheel movement to shock absorber movement either at the front or rear of the vehicle as this will vary in different types of suspensions and in the various desired locations of the shock absorber in such suspensions. Therefore, references herein to specific numerical values of wheel geometry and shock absorber parts are by way of illustrating the broad principles of my invention as applied to a typical vehicle from which teachings my invention may be readily adapted to other suspensions and to other wheel and shock absorber movement ratios as may be desired.

In the illustrated suspension for the rear of the vehicle, I have shown in Fig. 2 a conventional rear axle 20 for driving a rear ground wheel 21 at each side of the vehicle, the body and frame being sprung at each side by a leaf spring assembly 22 having conventional shackle connections to the frame at 23 and 24. The axle is secured at 25 to the spring assembly. In this instance my shock absorber is connected with studs and rubber bushings generally as in Fig. 1. However, the eye 16 is connected at 25a at the juncture of the spring and axle and the eye 15 is connected at 25b to a side rail portion 25c of the vehicle frame or body so that each shock absorber extends upwardly and forwardly from the axle and spring juncture to the vehicle frame. In the illustrated arrangement approximately 1.41" of vertical wheel travel produces 1" of shock absorber movement.

Inasmuch as the illustrated front and rear suspension systems and shock absorber installations, which I chose for some of my experimental work, give rise to different maximum strokes of the front shock absorbers relative to the rear shock absorbers, each front shock absorber was constructed to afford about a 4" stroke maximum and each rear shock absorber about a 7½" stroke maximum, some additional stroke movement being possible as a protection against breakage of its parts but not ordinarily experienced owing to conventional bumper pads 25d which limit wheel travel proportionately to the maximum shock absorber strokes. In order to accommodate these relatively differing maximum strokes the front and rear shock absorbers are of differing lengths, the collapsed lengths from the eye centers being about 8¾" and 12½" for the front and rear shock absorbers respectively, and the fully extended lengths being about 12½" and 20½" for the front and rear shock absorbers respectively.

Figures 3, 4, 5:
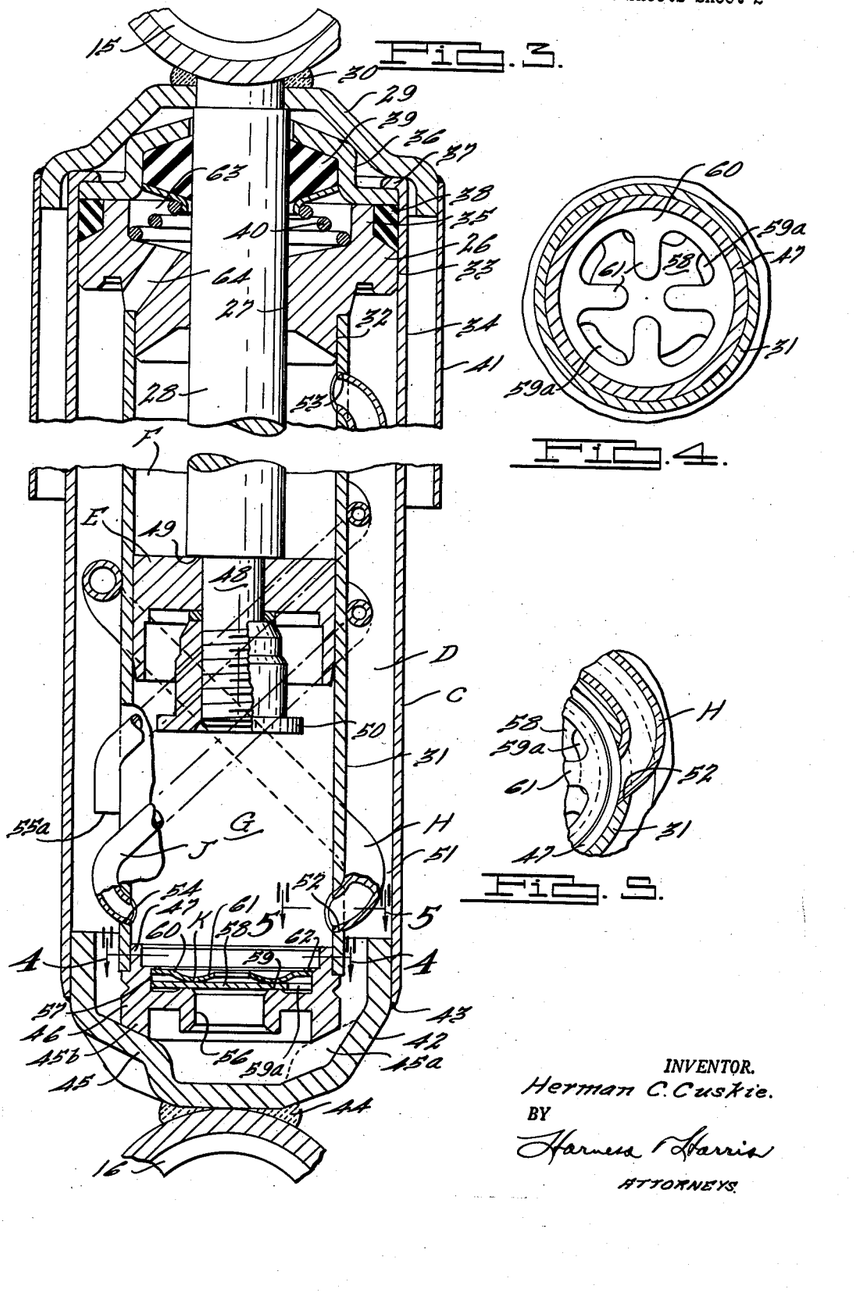
Fig. 3 is a sectional elevational view through my shock absorber.
Fig. 4 is a sectional plan view along line 4—4 of Fig. 3 showing the base check valve.
Fig. 5 is a detail sectional view according to line 5—5 of Fig. 3.

In Fig. 3 I have shown the principles of my invention embodied in a shock absorber C of the direct acting telescopic type capable of attachment at its eyes 15 and 16 directly to relatively movable parts for effecting the desired damping action. This shock absorber comprises an upper body member 26 having an axial bore 27 through which the working piston rod 28 is slidably fitted, the latter mounting the eye 15 at its upper end. Adjacent this eye the rod 28 is shouldered to receive the centrally apertured stamped end cover 29, the eye, rod, and cover being structurally united by a weld 30.

Depending from the body 26 in spaced relation with rod 28 is a tubular working cylinder 31 having its upper end fitting the shouldered cylindrical portion 32 of body 26. The body 26 has a second cylindrical portion 33 concentric with portion 32 and bore 27, the cylindrical portion 33 fitting within the outer tubular cylinder 34 which is radially spaced from cylinder 31 to provide a reservoir D for the working fluid of the shock absorber. Any of the well-known commercial shock absorber oils may be used as the working fluid in my shock absorber.

Body 26 has an upwardly extending flange 35 on which is seated the end cap member 36 centrally apertured to slidably receive rod 28 with clearance. The upper end portion of cylinder 34 engages the outer flanged periphery of the cap member 36 and is rolled at 37 into engagement with the upper face of this cap member thereby forming a secure assembly of tubes 32, 33 with the cap member 36 and body 26. Escape of fluid is prevented, in addition to the fit of the parts at 27, 33, and 37, by the oil-resistant flexible seal rings 38 and 39.

The seal ring 38 is located in a pocket adjacent flange 35 and provided by body 26 such that cap member 36 will compress the seal ring into engagement with the inner wall of cylinder 34 and with the other parts contacting the seal ring thereby preventing escape of oil from reservoir D upwardly between body 26 and cylinder 34. The seal ring 39 is pocketed within the cap member 36 in contact with rod 28, a compression coil spring 40 urging the seal ring into contact with the rod and cap member to prevent escape of fluid outwardly between the rod and cap. A tubular dirt shield 41 depends from the inner end of the end cover 29 spaced outwardly from cylinder 34 to guard against mud and dirt being thrown against the upper end parts of the shock absorber, particularly the rod 28 and parts bounding the space between cover 29 and cap member 36.

At the opposite or bottom end of the shock absorber the cylinder 34 has its end portion tightly fitted around the inner end portion of the bottom cap member 42 and welded thereto at 43 to maintain a structurally unitary fluid tight fit. The eye 16 is connected by weld 44 with the outer bottom closed face of the cap member 42. This cap has three relatively spaced regions of inward deflection as at 45 providing three relatively unrestricted passages for fluid within the cap member between the regions 45 as at 45a. The cap member at regions 45 is formed to present a downwardly and inwardly sloping wall to seat a similarly faced annular flange 45b of an annular base valve carrier 46 which is stepped annularly at 47 to pilot and seat the bottom end portion of cylinder 31. It will be apparent that with the parts assembled as thus far described at the bottom of the shock absorber, the parts at the upper end region of the shock absorber will maintain the assembly when the upper end of cylinder 31 is rolled or crimped as illustrated at 37.

The inner end of the piston rod 28 is reduced at 48 to receive a working piston E which is secured to the piston shoulder 49 thus formed by a fastener 50 threaded on the rod end 48. The piston E has a sliding fit within cylinder 31 and serves to divide the working space within this cylinder into two chambers bounded by the opposite working faces of the piston. The chamber F above the piston is the rebound chamber and is defined by the volume bounded by the inner walls of cylinder 31, the inner surface of body 26, and the upper face of piston E which is exposed to the fluid. The chamber F is, of course, defined by its cross-sectional area which is the cross-sectional area of the interior of cylinder 31 less the cross-sectional area of piston rod 28 and the change in volume of chamber F, as piston E moves, is the product of this cross-sectional area of chamber F times the distance through which the piston moves.

The other of the two chambers defined by piston E comprises the jounce or compression chamber G defined by the volume bounded below piston E, cylinder 31, and the upper surfaces of valve carrier 46 and valve parts carried thereby, and more particularly hereinafter described. The chamber G is, of course, defined by its cross-sectional area which is the cross-sectional area of the interior of cylinder 31 and the change in volume of chamber G, as piston E moves, is the product of this cross-sectional area of chamber G times the distance through which the piston moves.

In the particular shock absorber illustrated in Fig. 3 the diameter of the piston rod 28 is approximately ½" and that of the bore of cylinder 31, and hence the approximate diameter of piston E, is substantially 1". These dimensions are, of course, arbitrarily selected and are set forth merely by way of example for the size and capacity of shock absorber which I have employed for the illustrated types of motor vehicle suspensions. These particular whole number dimensions are also of assistance for convenience of reference and discussion in illustrating the principles of my invention. For example, the ratio of cross-sectional areas of chambers G and F is 4 to 3 and as piston E moves the chambers G and F vary in volume in this same ratio for a given piston movement.

As thus far described, it will be apparent that on compression or jounce, occasioned by a wheel striking a bump in the road, the shock absorber eyes 15 and 16 will move relatively toward each other accompanied by yieldingly loading the suspension spring 14 or 22, as the case may be, in addition to its static load. On rebound, as when the wheel recovers from its jounce movement and when a wheel falls away from the level into a hollow in the road owing to its own weight and that of its associated parts along with the force of its associated suspension spring, the eyes 15 and 16 will move relatively away from each other. Moving with the eye 15 are the piston rod 28 and parts attached thereto including piston E, cover 29, and shield 41. The remaining parts move with the eye 16. For convenience of reference in my specification and claims, I shall refer in most instances to this relative movement as movement of piston E, it being apparent that the shock absorber action occasioned by relative movement between cylinder 31 and piston E may be regarded as though cylinder 31 was fixed and all movement took place at eye 15 and piston E.

I deem it to be desirable in general automotive practice to provide a damping resistance by the shock absorber which is approximately the same for both the compression and rebound strokes. With my shock absorber providing rapid damping of oscillations with improved efficiency and better comfort to the passengers it is not necessary or desirable to provide for quick build-up of peaking resistance in either of the compression or the rebound strokes as is common practice with conventional shock absorbers. Conventional shock absorbers rely on damping action over a relatively large number of oscillations or cycles between the sprung and unsprung masses attended by and, in fact large measure caused by, an insufficient amount of work done by the shock absorber for each of its strokes. Conventional shock absorbers operate with this undesirable characteristic since, among other things, the resistance must be kept fairly low to be reasonably effective for short strokes with the result that there is inadequate resistance provided for long strokes. Even with modern compromises the resistance is inadequate for short strokes and even more so for long strokes and harshness and jolting are experienced for almost all ranges of operations. Furthermore, conventional shock absorbers do not damp oscillations quickly enough so that on rough roads amplitudes build up unduly thereby limiting vehicle safe driving speeds, developing undesirably high temperatures in the shock absorber, and failing to provide the desired degree of passenger comfort.

In contrast with conventional shock absorbers, I have provided a method and apparatus, presently more apparent, which overcomes the aforesaid disadvantages and undesirable characteristics. My shock absorber operates on a principle of viscous flow damping utilizing control passages for friction flow of viscous fluids, such passages being of such length, cross-sectional area, and number so that within the range of piston velocities experienced in automotive practice, the resistance developed by the shock absorber varies substantially directly with piston velocity as a linear first power relation, the resistance being free from abrupt changes throughout the piston stroke, and the pressures developed in the compression chamber G being utilized with improved efficiency in providing added resistance relative to pressure and resistance relationships in conventional shock absorbers.

In carrying out the objects of my invention, I provide some form of shuttle passage means for restricted flow of fluid between chambers F and G when the piston E moves in each direction of its reciprocatory stroke. The term "shuttle" as applied in my claims with reference to the shuttle passage means H is used to define two-way liquid flow back and forth through the same passage means depending on the direction of reciprocatory movement of the piston with induces such shuttle flow. Such shuttle passage means maintains these chambers in restricted two-way liquid flow communication with each other free from valve-controlled fluid flow therethrough at all times so that the viscous flow resistance inherent by the size, shape and number of passages constituting such passage means provides the total resistance to fluid flow through such passage means. The fluid is thus shuttled back and forth through the open ends of the shuttle passage means in passing from one side of the piston E to the other side.

Apart from the outlet and inlet from and to chamber F provided by the shuttle passage means, the chamber F is preferably otherwise closed. However, because of the differential in volume change between chambers F and G occasioned by piston rod 28 disposed in chamber F, provision is made to accommodate escape of fluid displaced by rod 28 into reservoir D during the compression stroke and to accommodate unrestricted return of such fluid from the reservoir to chamber G on the rebound stroke to insure against cavitation developing in chamber G.

In the present embodiment of my invention, the shuttle passage means comprises a tube or conduit H having one of its ends open to chamber F at all times and its other end open at all times to chamber G. This tube H comprises a series of convolutions coiled around cylinder 31 and is disposed within reservoir D. This tube does not by preference fully radially bridge the space between cylinders 31 and 34 although it nearly does so, a space 51 being provided between the tube and one of the cylinders 31, 34. In my drawing this space 51 is shown between the tube H and cylinder 34. If desired the tube may be spaced a small amount from each of these cylinders 31, 34. The tube H, in addition to its functioning as a shuttle passage, prevents undesired surge of the fluid in reservoir D as the shock absorber is moved up and down, such surge tending to froth the fluid by picking up air particles from the space above the level of fluid in the reservoir. Thus the tube H, assisted somewhat by a smaller tube disposed between the convolutions of the larger tube H as hereinafter referred to, operates as a spiral baffle in inducing spiral movement to the fluid in reservoir D effectively preventing surge of the fluid and keeping air particles out of the fluid.

At its lower or compression chamber end the tube H has an end fitted in an opening 52 of Fig. 5 in cylinder 31 near the bottom of chamber G where piston E will not at any portion of its stroke cover any portion of this opening. The cross-sectional area presented to fluid flowing from chamber G into tube H is maintained at each end of tube H where it extends through the wall of cylinder 31 so that there is no restriction at the ends of the tube. It is of no moment if the cross-sectional area open to fluid flow is greater at the tube ends than that of the tube itself as no restriction would be thereby introduced to the fluid entering or leaving the tube H. At its upper end the tube extends through cylinder 31 near the upper end thereof clear of piston E at all times, this end of the tube fitting a cylinder opening 52 just as shown in Fig. 5. The tube ends are silver soldered in the respective openings 52 and 53 to prevent leakage whereby the fluid is compelled to pass through tube H between chambers F and G. The shuttle passage means or tube H thus has constantly open communication between the compression chamber G and the rebound chamber F through aperture means having constantly open communication with the rebound chamber and through aperture means having constantly open communication with the compression chamber. In the illustrated embodiment of the invention the ends of the tube H adjacent the openings 53 and 52 respectively provide such aperture means having constantly open communication with the rebound and compression chambers. All of the liquid flowing from rebound chamber F to the compression chamber G during all rebound strokes passes through the aforesaid aperture means adjacent opening 53 and all of the liquid flowing to the rebound chamber during all compression strokes passes through the aforesaid aperture means adjacent opening 52.

Chamber G is provided with viscous flow means for controlling fluid flow from this chamber into the reservoir D. This flow means, according to the present illustrative embodiment of my invention, comprises a jounce or compression chamber escape passage means illustrated in the form of an escape tube J of smaller diameter than tube H and having one end fitted and silver soldered in an opening 54 of cylinder 31 for non-restrictive flow of fluid from chamber G into tube J similar to the fitting shown in Fig. 5. The opening 54 is likewise never closed or partially closed by the piston E.

Figures 9, 10, 11, 12:
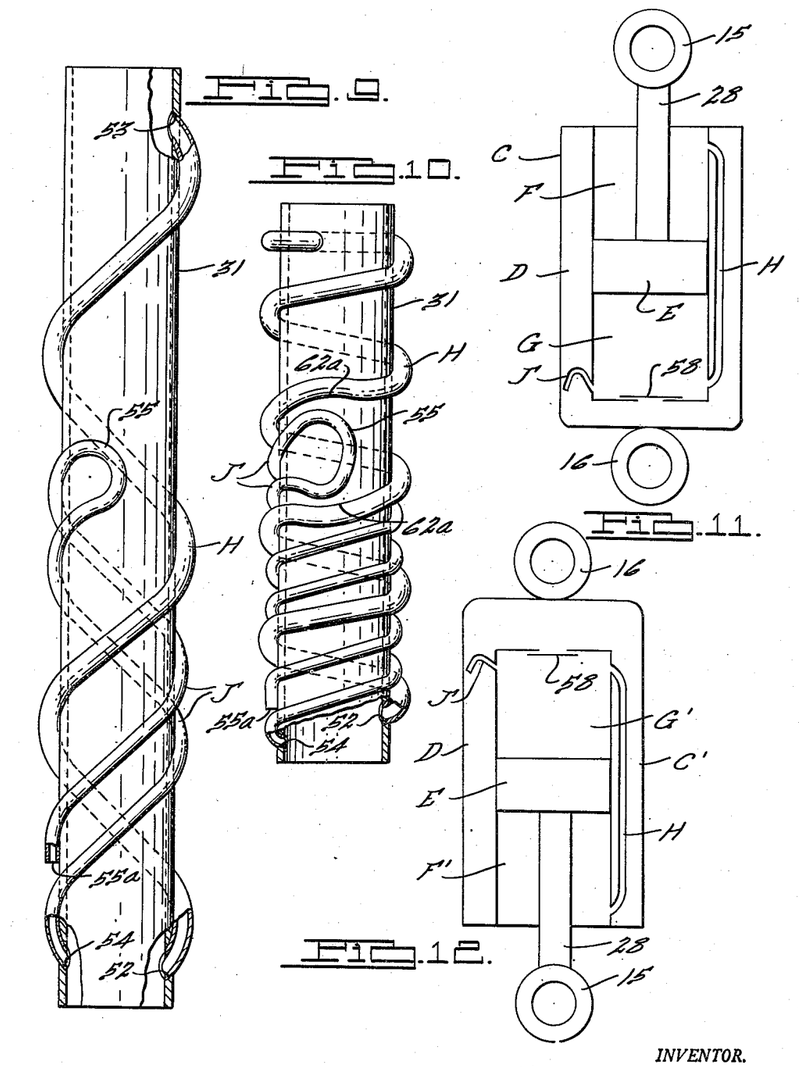
Fig. 9 is an elevational view for the cylinder and associated fluid conduits of my rear shock absorber, parts of the cylinder being broken away.
Fig. 10 is a similar view for my front shock absorber.
Fig. 11 is a view generally similar to Fig. 3 but diagrammatically showing the working parts of my shock absorber.
Fig. 12 is a view similar to Fig. 11 but showing the parts inverted.

The tube J has its opposite end open into the reservoir D at some suitable point preferably arranged so that it will not direct a stream of fluid form tube J into the air space in reservoir D above the level of fluid therein since to do so would froth the fluid and undesirably entrain air particles. The space between the convolutions of tube H is utilized to receive the tube J which is wound spirally. The reservoir end of tube J may be adjacent the level of fluid in reservoir D, if the selected length and diameter of tube J accommodates such arrangement conveniently, such tube end being directed downwardly in reservoir D so as not to discharge its stream toward the air space which would have a tendency to entrain air in the reservoir fluid. Another arrangement which I have found to be satisfactory, and which is best shown in Figs. 9 and 10 for the rear and front shock absorbers respectively, is to arrange tube J with a hairpin-like return bend at its mid-length, as at 55, with one end of the tube fitted in the opening 54 as aforesaid. The tube is then wound spirally upwardly from opening 54 around cylinder 31 between the convolutions of the shuttle passage tube H, such convolutions being so arranged as to accommodate therebetween the two portions of tube J. The spiral arrangement of tube J assists tube H in preventing surge of fluid in reservoir D augmenting the spiral baffling effect of tube H in preventing entrainment of air in the reservoir fluid as aforesaid. The open end of the tube at 55a in this arrangement is adjacent the end at 54 and is directed downwardly in the reservoir with a minimum surge of the fluid level in the reservoir.

Referring now to the check valve means K between the chamber G and reservoir D, the base valve carrier 46 is provided with an axial passage 56 therethrough of such diameter as to afford free flow of fluid from reservoir D to chamber G. The carrier 46 has an upwardly open cylindrical counterbore 57 for slidably receiving a plate check valve 58 seating on a rib 59 bounding the upper end of passage 56. The valve 58 has peripheral openings 59a of ample capacity for unrestricted fluid from passage 56 to chamber G when valve 58 unseats. A spring 60 is fitted within bore 57 at its upper end and has dished spring fingers 61 extending radially inwardly from its peripheral rim to yieldingly retain valve 58 under very light load seated at 59, the portion of carrier 46 adjacent the upper end of bore 57 being peened inwardly at 62 to retain the spring 60 in assembled relation. During the compression stroke of piston E when the latter moves toward valve carrier 46, valve 58 will remain seated and prevent any escape of fluid from chamber G to reservoir D, all such fluid displaced by the piston being compelled to flow through the shuttle passage means to chamber F and to reservoir D by the compression chamber escape means. However, on rebound upward movement of piston G has a suction effect on valve 58 and since this valve is only lightly held to its seat it readily unseats and freely admits fluid from reservoir D to chamber G so as to maintain chamber G filled with fluid during rebound after which valve 58 again seats.

The shuttle passage means may be formed as a plurality of passages disposed in convenient manner and open to both chambers F and G and in its broader principles my invention is not limited to a single passage means such as tube H or to any particular location of such passage means, it only being required that such passage means shall have its opposite ends respectively communicating with chambers F and G. This shuttle passage means presents such total length and cross-sectional area for fluid flow to provide the desired friction viscous flow as aforesaid in relationship with the compression escape means which may be of any desired number of passages between chamber G and reservoir D so as to present a total length and cross-sectional area functioning according to the principles of my invention.

My shuttle passage means H presents substantial length, as distinguished from short plate orifice fluid flow arrangements, as by reason of my invention I obtain the desired damping control of extreme or relatively long stroke rebounds and at the same time I obtain the desired damping control for mild or relatively short stroke rebounds. Conventional short plate-type orifices are deficient in adequate damping for mild or relatively short stroke rebounds if proportioned for adequate damping control for the more extreme or relatively long stroke rebound performance of the shock absorber. Relatively long total length of my shuttle passage means is furthermore advantageous as rebound strokes of piston E occur under forces determined for the most part by the spring between the vehicle body and wheel and hence are fixed as distinguished from impact forces on the wheel for the jounce or compression movement of the piston. Under fixed spring forces for the rebound my shuttle passage means of substantial length will provide sufficient and improved damping resistance for long rebound strokes as well as for short rebound strokes which short fluid orifices operating with velocity damping would not provide. While a short orifice can be proportioned for a desired high resistance at full piston stroke, such orifice would not then provide the required damping at short piston stroke or, if proportioned to be adequate for short stroke it would overcontrol at full stroke. Conventional shock absorbers, employing short orifice control, are consequently inefficient and harsh as they require compromises for damping action under long and short strokes, blow-off valves, and other controls on the fluid flow controls.

As an example of difficulties attendant to short orifice controls proportioned to favor short rebound stroke but necessarily providing overcontrol at long stroke, closely repeating long stroke operation tends to ratchet the vehicle body downwardly and introduce cavitation in the rebound chamber as full jounce recovery is not obtained because the overcontrol introduces such resistance that there is not time for the desired rebound stroke to take place before the next jounce stroke occurs. With my shock absorber difficulties of this sort do not occur as my viscous flow control, for both compression and rebound, provides resistance to piston movement which varies approximately directly with piston velocity as a linear first power relation whereas resistance obtained with short orifices operates with velocity damping and generally speaking is proportional to the square of piston velocity or some power substantially greater than one.

My shuttle passage means provides two-way viscous damping flow between chambers F and G, such passage means being unrestricted and depending on viscous damping resistance occurring by forcing the fluid through the open-ended shuttle passage means which is limited in capacity by its number, diameter, and length, its flow capacity being such that for all jounce strokes of the shock absorber the rebound chamber F will be filled at all times and free of cavitation which would undesirably alter the desired resistance on rebound. By proportioning the shuttle passage means according to my invention I maintain chamber F filled preferably with a minimum of positive pressure therein during jounce strokes because such arrangement greatly increases the efficiency and smooth performance of the shock absorber with relatively less fluid pressures in the compression chamber G than has heretofore been deemed necessary for desired jounce resistance.

Thus it will be apparent that during jounce any positive pressure in the rebound chamber is at the expense of jounce resistance. If for example the pressures in chambers F and G were allowed to equalize during jounce then the jounce resistance is the result of the pressure of the fluid in the compression chamber G acting on a piston area equal to the cross-sectional area of rod 28 whereas if the pressure in chamber F is maintained without substantial positive pressure during jounce then the jounce resistance will be the result of the pressure in chamber G acting on substantially the full area of piston E which is the relationship according to the optimum results obtained by my invention.

By way of one specific example of carrying out my invention, I have obtained good results in keeping with the objects of my invention by employing shuttle passage means in the form of the illustrated tubular conduit H. My rear shock absorbers, for the illustrated type of rear suspension and aforesaid ratio of wheel and shock absorber piston displacements, is provided as in Figs. 3 and 9 with a $\frac{3}{16}''$ tube H of 12'' length, the inside diameter of such tube which determines fluid flow characteristics therethrough being .1275'' or approximately $\frac{1}{8}''$, the tube wall thickness being .030.'' The compression chamber escape means for each such rear shock absorber was provided in the form of the illustrated tube J of $\frac{1}{8}''$ diameter, having a wall thickness of .030'' providing an inside diameter of .065'' or approximately $\frac{1}{16}''$, and a length of about 13''.

Because of the longer wheel travel per inch of shock absorber piston movement in the vehicle installation given herein by way of example for the front shock absorbers as compared with the relatively lesser wheel travel per inch of piston movement for the rear shock absorbers, it is desirable to provide somewhat higher resistance by the front shock absorbers than for the rear shock absorbers thereby compensating for the lesser effective leverage action at the front shock absorbers. Furthermore, in many types of suspension, static friction, load, wheel base, and spring rates by way of example may be different at the front and rear of the vehicle making it desirable to proportion the damping effect of the front and rear shock absorbers to compensate for such differences. Therefore, with the foregoing considerations in view, I provide each of my front shock absorbers with a shuttle tube H the same as that for the rear shock absorbers but of increased length as in Fig. 10, such length being about 20'' instead of 12'' for the rear shock absorbers. The companion tube J for each front shock absorber is the same as that for the rear shock absorbers but of increased length, such length being about 20'' instead of 13'' for the rear shock absorbers. Fig. 3 illustrates one of the rear shock absorbers, it being understood that the front shock absorbers are similar except for difference in stroke capacity and in the aforesaid lengths of the corresponding tubes H and J as shown in Fig. 10.

The tubes H and J for each front shock absorber being of substantially greater length than the corresponding tubes for each rear shock absorber, and cylinder 31 being shorter in length for the front shock absorber than for the rear, the diameters of tubes H and J being the same in the front and rear shock absorbers, it is desirable where the hairpin arrangement for tube J is employed to spread the convolutions of tube H apart in the region of return bend 55 for the front shock absorber. This spreading, in addition to the normal spacing of the convolutions of tube H, is illustrated at 62a and accommodates a more sweeping return bend 55 of tube J than could otherwise be accommodated. It is desirable for best results which I have illustrated to avoid sharp bends or other restrictions to fluid flow through tubes J and H other than viscous damping incident to resistance to fluid flow through these smooth walled uniform cross-section open ended tubes. For the rear shock absorber the relatively shorter tube H has its convolutions normally spaced sufficiently so that further spreading of the convolution portions adjacent the return 55 of tube J is not ordinarily necessary in avoiding an undesired sharp bend in tube J.

Carrying further the aforesaid values given by way of illustrating a typical installation of my shock absorbers to front and rear vehicle suspensions, the cylinders 31 were of different lengths for the front and rear shock absorber to correspond with the aforesaid differing maximum strokes. Thus the cylinder 31 for the rear shock absorber was about 9.227" in length and for the front shock absorber about 5.477" in length. With the aforesaid tube lengths coiled on these cylinders the tube H for the rear shock absorber will have about 2 turns and about 4.7 for the front shock absorber if the convolutions are equally spaced. Figs. 9 and 10 illustrate this general pattern of cylinder and tube arrangements respectively for the rear and front shock absorbers.

The capacity of the compression escape passage means J must bear a predetermined relationship to that of shuttle passage means H. My invention utilizing viscous damping in conduit J° accommodates the desired progressively smooth resistance build up on jounce proportioned to piston velocity variations while maintaining the rebound chamber F filled, the shuttle passage H passing with accompanying viscous damping sufficient fluid from chamber G to chamber F to insure against cavitation in chamber F while maintaining the pressure in chamber F at a minimum sufficient to insure against such cavitation whereby substantially the full piston area is utilized to develop jounce resistance.

I desire to point out that during jounce the shuttle passage means H between chambers G and F is responsible for most of the resistance work or damping developed by my shock absorber, the compression chamber escape means J being responsible for a lesser amount. In the example chosen for illustrative purposes wherein the areas of the piston E and rod 28 are in the ratio of 4 to 1, the shuttle passage H is responsible for nearly 75% of the total jounce resistance work as it handles substantially three times as much fluid as passage J which, of course, must pass the fluid displaced by rod 28 into the reservoir chamber D. By effecting such relatively great amounts of resistance work in the shuttle means H the fluid is much more rapidly heated in the working chambers F and G and the shock absorber reaches its average normal working temperature condition much more rapidly than with conventional shock absorbers. By my method of viscous damping I effect more energy absorption at a lower pressure than heretofore, most of the energy absorption being effected through the shuttle passage means. My compression escape viscous flow means J is preferably so proportioned in relation to the shuttle passage means H that the flow means J will provide a rate of discharge into reservoir D at any pressure developed in the jounce chamber G under varying piston velocities such that at any given piston velocity the shuttle viscous flow means H will pass slightly more fluid in proportion to the displacement of the piston area less the rod area than the passage means J will pass in proportion to the displacement of the piston rod area alone, the excess insuring against cavitation in the rebound chamber F.

As will be apparent from Fig. 3 chamber F is closed except for the communication with the open end of the tube H, this tube unrestrictedly communicating freely with chamber F. Any fluid which may work past rod 27 will drain from spring chamber 63 down through passage 64 in member 26 and into reservoir D. Chamber G, except for check valve 58 which is closed during jounce, is likewise closed except for the communication with the opposite end of tube H and with one end of tube J, these tube ends communicating unrestrictedly with chamber G. On rebound, check valve 58 freely admits fluid from reservoir D to chamber G in quantity largely replacing that ejected through tube J on compression, it being apparent that the viscous resistance to fluid flow through tube J will not cause substantial back flow through this tube on rebound.

Figure 6:
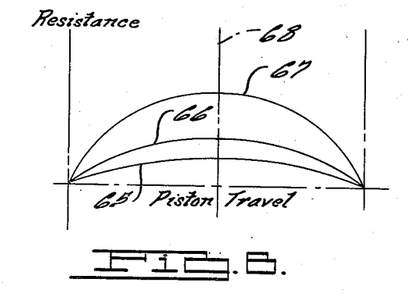
Fig. 6 is a diagrammatic illustration of typical performance characteristic of my shock absorber, resistance being plotted against piston travel.
Figure 7:
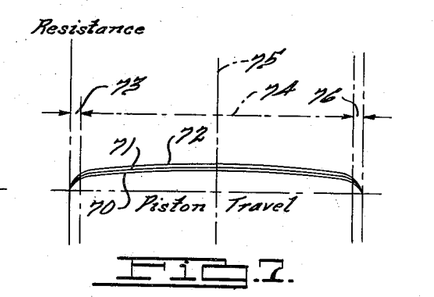
Fig. 7 is a view similar to Fig. 6 illustrating comparative characteristics of the aforesaid conventional shock absorber, Fig. 6 being shown adjacent Fig. 7 to facilitate comparison of performance between my shock absorber and a conventional one.
Figure 8:
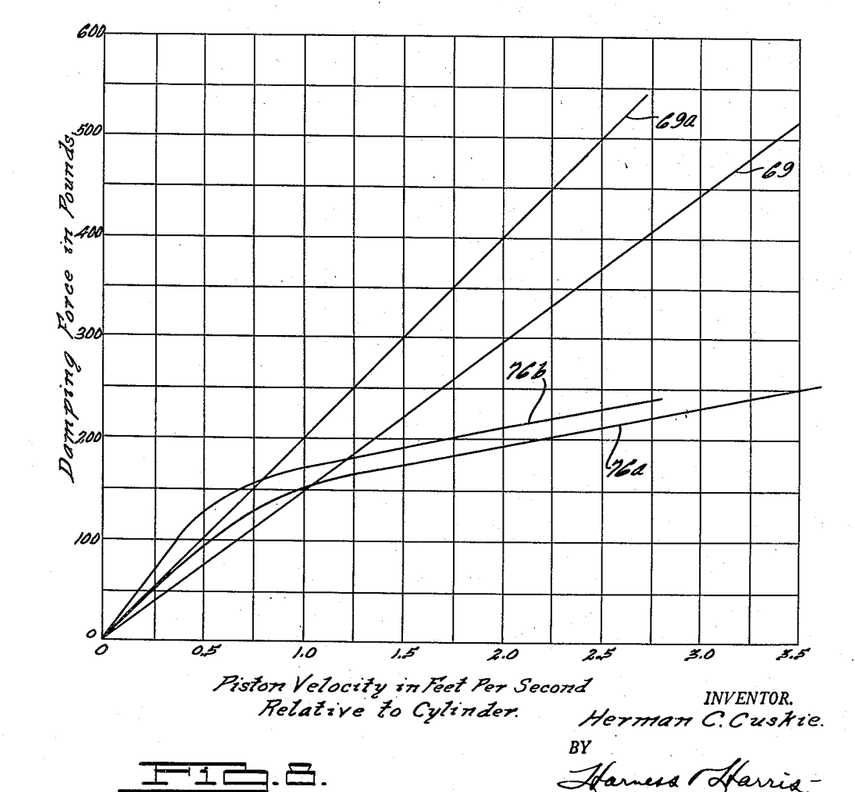
Fig. 8 is a diagrammatic illustration of typical performance characteristic of the damping principle which I employ in my shock absorber, damping force being plotted against piston velocity.

Referring to Figs. 6 and 8, I have somewhat diagrammatically illustrated certain typical performances of my shock absorber and my novel damping principles in contrast with typical conventional performance characteristics shown in Fig. 7.

In Fig. 6, I have illustrated typical resistance curves 65, 66, and 67 developed by machine operation of my shock absorber, resistance being plotted against piston travel, the machine being of the well known type employed in shock absorber tests in which the piston is moved relative to its cylinder with approximately simple harmonic motion derived by connecting a rotating crank with the shock absorber piston rod. These curves 65, 66, and 67 illustrate forced resistances developed by my shock absorber during operation of the test machine at constant stroke for 55, 100, and 200 R. P. M. respectively and substantially duplicate actual performance of the shock absorber on the vehicle for variations in conditions between mild and severe rebounds by action of the suspension spring after wheel jounces have occurred with proportionate severity. In each instance the resistance builds up smoothly under viscous damping to a maximum at piston mid-stroke regardless of maximum piston velocities indicated at 68 and then falls off smoothly under viscous damping to zero as the piston reaches the end of its rebound stroke. It will be noted that the resistance build-up portion of each curve up to the piston mid-stroke at 68 is similar to the remaining half of the curve when the resistance diminishes from the piston mid-stroke to the end of the stroke.

As will be noted from the Fig. 6 curves there is no abrupt change in resistance build up or decrease as is experienced in conventional shock absorbers, my shock absorber operating by viscous damping wherein the damping force is substantially a straight line function of piston velocity generally as indicated at 69 in Fig. 8 in which the damping force of my rear shock absorber is plotted against the velocity of the piston relative to its cylinder under average ambient temperatures of about 80° F. Marked temperature variations will effect slight orientation of the performance characteristic 69 about its zero point, this characteristic becoming slightly steeper than illustrated for marked temperature drop and slightly less steep than illustrated for marked temperature increase but nevertheless retaining its straight line viscous flow characteristic. Over temperature ranges experienced in vehicle driving for both summer and winter my shock absorber, operating with conventional fluids, functions with almost unnoticeable variation and in all instances offers marked improvements in vehicle damping control. Under severe cold conditions the operating cycle provided by my operating principles causes the shock absorber fluid to rapidly attain an operating temperature to which the parts are proportioned for obtaining the best results. It is obvious that the proportions of my fluid flow parts may be varied as desired to attain any desired approach to my principles and my present discussion is, in general directed to the attainment of optimum damping efficiency and performance. By reason of the predetermined proportioning of the tubes H and J different for the front and rear shock absorbers, to provide more resistance for the front shock absorber, the force-velocity characteristic for the front shock absorber will be somewhat steeper than line 69 under the same conditions and is shown by line 69a in Fig. 8. It will be apparent that the principles of my invention accommodate proportioning of the fluid passages so as to obtain any desired slope for the characteristic 69.

The Fig. 6 curves 65, 66, and 67 are merely typical and illustrate the pattern obtained by my damping principles. For piston velocities other than those developing the illustrated curves, and for other piston stroke lengths, other curves of the same general characteristic will be obtained following the illustrated pattern. The illustrated curves are typical of those obtained by operation of both the front and rear shock absorbers on the test machine for approximately 3″ strokes for the front shock absorber and 4″ strokes for the rear shock absorber. Increased and also decreased strokes result in the same pattern of resistance curves as those illustrated in Fig. 6 and with the same characteristic straight line, or closely approximating straight line, force-velocity relationship 69 of Fig. 8 obtained over the range of jounce and rebound wheel movements experienced in vehicle operations.

The jounce characteristics of my shock absorber are generally the same as the Fig. 6 typical rebound curves so that the curves 65, 66, and 67 serve as illustrative for both jounce and rebound. Furthermore for a given maximum piston velocity and stroke on both the compression and rebound my shock absorber performs with about the same damping characteristics which I regard to be desirable. I closely approach this desirable relationship by so proportioning the parts given herein by way of example so that the pressures of the liquid in chambers F and G are approximately equal to each other for a given piston velocity in each direction of movement of the piston. However, there is a tendency for the jounce or compression resistance curves to reach a slightly higher point than the corresponding rebound curves for the same stroke conditions, this being accounted for because of the piston area differential for jounce and rebound strokes.

By relatively proportioning the shuttle passage means in relation with the compression escape passage means according to my teachings the jounce and compression resistances, for a given piston velocity, may be made to closely approach each other in value within limitations requiring that the rebound chamber will not be subject to cavitation and by reason of the differential area relation of the piston. With the rebound and compression resistances so related with respect to each other the resulting vehicle ride characteristics are much improved as the resulting rapid damping of wheel and body oscillations takes place without unduly high resistance in either direction. With each increase in piston velocity there is obtained a corresponding directly proportional increase in peak velocity during both jounce and rebound in conformity with the viscous flow principle of an approximately straight line relationship 69 or 69a of Fig. 8 between damping force and piston velocity. At the same time excessively high pressures are not experienced for customary vehicle operations and abrupt change in resistance and pressure during any jounce or rebound stroke is avoided owing in large measure to utilization of the viscous damping characteristic and substantially the full piston area on jounce. However, the resistances obtained by my shock absorber are somewhat higher than those tolerable in more conventional dampers over much of the range of jounce and rebound strokes customarily experienced and the attaching studs 17 for the eyes 15 and 16 should be proportionately stronger than those conventionally employed.

In Fig. 7 I have illustrated typical performance curves 70, 71, and 72 for a conventional shock absorber referred to herein as being of the "blow-off" type in which fluid pressure in both the jounce and rebound chambers builds up rapidly, then abruptly flattens off with only slight build-up for nearly all of the piston stroke, and then abruptly falls off. These curves illustrate the same conditions of operation and for the same size shock absorber as for my Fig. 6 characteristics, the scale being the same. Thus the Fig. 7 conventional characteristic curves could be superimposed on Fig. 6 for comparative marked contrast but for clarity they are shown adjacent each other where comparison may be conveniently made.

In Fig. 7 for each of the widely varying piston velocities as determined by the test machine crank operation at 55, 100, and 200 R. P. M. corresponding to resistance curves 70, 71, and 72 respectively, it will be apparent that the curves are very close to each other and that peak resistances developed are nearly the same in spite of the wide variation in piston velocity. Thus in each instance resistance rapidly builds up over the very short initial portion of the piston stroke 73 at which time the conventional blow-off relief valve opens to prevent further substantial pressure rise. This results in an abrupt objectional change in the rate of resistance increase, the resistance at blow-off being generally maintained through nearly the entire piston stroke as indicated by the stroke portion 74. The slight resistance rise to the mid-point 75 during the stroke portion 74 is largely the result of slight added resistance to fluid flow through the blow-off valve. Then, as the piston velocity approaches rest at the end of its stroke with resulting diminution of fluid pressure on the piston the blow-off valve closes abruptly and the resistance rapidly falls off to zero during the small portion of the terminal piston stroke as at 76. The compression characteristics for this conventional type of shock absorber are substantially the same as shown in Fig. 7.

In Fig. 8 I have shown by the lines 76a and 76b the approximate characteristic of a rear and front conventional type shock absorber respectively which produces the Fig. 7 resistance characteristic. This velocity type of damping typical of conventional shock absorbers incorporating pressure relief blow-off valving, aside from its inefficiencies and poor ride "feel" in comparison with my shock absorber, provides a resistance pattern which fails to properly proportion itself to the intensity of the jounce or rebound according to the desirable Fig. 6 performance of my shock absorber. In my shock absorber each resistance peak is substantially directly proportional to the maximum velocity attained by the piston and occurs at the mid-stroke of the piston where maximum velocity takes place. Thus in Fig. 6 the peak resistance at 68 for curve 67 developed at 200 R. P. M. is substantially twice that for curve 66 developed at 100 R. P. M., the maximum piston velocity for curve 67 being twice that for 66. Similarly the peak resistance for curve 65 developed at 55 R. P. M. is substantially 55% of the peak resistance for curve 66 developed at 100 R. P. M. Likewise other lesser and greater maximum piston velocities will provide resistance curves similar to those shown and developing peak resistances less or greater than those shown in direct proportion to the piston velocities which are being compared in any instance.

It is noted that it is not desirable to fit rod 28 at 27 too tightly and the same holds for the fit of piston E in cylinder 31, it being more advantageous to tolerate a small amount of leakage than to unduly increase friction at the sliding parts by attempting to obtain fluid tight fits by providing very tightly fitting parts and use of seal rings and the like.

The compression or jounce escape passage means J is proportioned as aforesaid in relationship with the shuttle passage means H for viscous damping control of fluid displaced in effect by the volume of rod 28 on the compression stroke with sufficient restriction provided in tube J by its uniform cross-sectional area and unrestricted end openings to insure building up during jounce of sufficient pressure in the compression chamber G so that fluid will flow through the shuttle passage means H under viscous damping control to maintain rebound chamber F filled, without cavitation, under all piston velocities.

By progressively shortening tube J or increasing its diameter or both, without change to tube H, flow through tube J becomes proportionately less restricted or impeded resulting in progressive diminution of compression resistance developed by the shock absorber and progressive approach toward cavitation and then effecting cavitation in increasing degrees in the rebound chamber F. Conversely by progressively lengthening tube J or decreasing its diameter or both, without change to tube H, the tube J will still control escape from chamber G of fluid displaced in effect by rod 28 on the jounce stroke, but flow through tube J will become proportionately more restricted or impeded resulting in increasing pressures in chambers G and F at the expense of net resistance developed by failure to effectively utilize the full piston area and also with the result that resistances on jounce will tend to be excessive.

The shuttle passage means is proportioned as aforesaid in relationship with the jounce escape passage means J for viscous damping control of rebound and the major portion of jounce with sufficient restriction provided in tube H by its uniform cross-sectional area and unrestricted end openings to insure passage of sufficient fluid to the rebound chamber F on compression strokes to prevent any cavitation therein and utilization of substantially the full piston area for developing resistance and also to provide the desirable viscous damping characteristics of substantially the same general pattern for both jounce and rebound at the same piston velocities and strokes.

By progressively shortening the tube H or by increasing its diameter or both, without change to tube J, both the rebound and compression resistances will proportionately fall off, the pressure in chamber F increasing during jounce at a sacrifice to effective utilization of the full piston area in degree proportionate to the change or changes made to tube H. Conversely by progressively lengthening tube H or decreasing its diameter or both, without change to tube J, the tube H will still control compression and rebound resistance but since fluid flow resistance through tube H will increase both rebound and compression resistances will increase and there will be a progressive approach toward cavitation and then effecting cavitation in increasing degrees in the rebound chamber F during compression strokes.

It will be apparent that simultaneous changes to the shuttle passage means and to the compression chamber escape means may be made in proper relationship with each other so as to preserve the desired over-all characteristics taught by my invention and within the scope of my invention. For example, a plurality of shuttle passages may be employed if desired in conjunction with a single compression chamber escape passage or with a plurality of escape passages. Likewise a plurality of compression chamber escape passages may be employed with a single shuttle passage. Furthermore, by changing the diameter of both the shuttle passage means and the compression chamber escape means the lengths of such passages should be changed over those illustrated. In each instance of changes as aforesaid it is only necessary to preserve the viscous damping characteristic and other desirable performance characteristics obtained by employing the principles of my invention such that the fluid flow characteristics provided by the various passages will perform in relationship with each other according to the principles as set forth herein. Thus, in carrying out these principles, and by way of operative example and not by way of limitation, the shuttle passage means H and escape passage means J may be designed to offer flow resistances respectively substantially equal to those offered by the lengths and diameters of tubes H and J as hereinbefore set forth by way of example for the size of shock absorber illustrated.

Sufficient oil is used in my shock absorber so that with chambers F and G filled, the reservoir D will be about half filled when the shock absorber is fully extended and about two-thirds full when fully collapsed.

In my drawings as thus far referred to, I have illustrated my invention in connection with a direct acting hydraulic shock absorber C in which, according to general practice, the reservoir D moves as a unit with the working cylinder 32 for connection at eye 16 to respond to movement of a vehicle ground wheel, the piston E being connected through piston rod 28 and eye 15 to respond to movement of the vehicle body. This arrangement is diagrammatically illustrated in Fig. 11, the liquid passages H and J and other parts hereinbefore more fully shown and described being diagrammatically shown for simplicity of illustration.

If desired, my shock absorber C' may be inverted as diagrammatically illustrated in Fig. 12, it being understood that corresponding parts are, except as noted hereinafter, the same as shown in Figs. 3 and 11. In Fig. 12 the eyes 15 and 16 are now connected to the parts previously described as connected to eyes 16 and 15 respectively when the shock absorber is assembled with motor vehicle suspension of the types illustrated. In this instance the chambers G' and F' are identical in function to chambers G and F respectively but because the check valve 58 is now disposed at the upper end of the shock absorber, the reservoir D must, of course, have an adequate head of liquid above this valve. Accordingly the reservoir space adjacent the check valve is made of larger capacity than in Fig. 3 or, if desired, a separate reservoir may be mounted on cylinder 34 above valve 58 and connected with an open pipe or passage to reservoir D. Also, if desired, my shock absorber may be arranged horizontally just so long as ample reservoir fluid is available at all time, without air, to the demands of check valve 58 and as long as escape passage J is not exposed to air. In Fig. 12 the jounce chamber G' is now disposed above the rebound chamber F' and references in my description and claims to parts extending upwardly or downwardly from other parts or equivalent terminology of relative positions of parts are to be read only in a relative sense as will be readily understood from the inverted relationships of the parts in Figs. 11 and 12. Furthermore, by interposing linkage between one of the eyes 15 and 16 and the suspension parts, the chamber F may be made to operate on jounce and chamber G on rebound without departing from the broader aspects of my invention.

In my accompanying drawings, the Fig. 3 shock absorber is shown approximately twice its actual size, the parts illustrated in Figs. 9 and 10 being shown approximately full size. In Figs. 11 and 12 the parts are not proportioned according to the other views as these views are diagrammatic representations of my shock absorber.

From what has been said herein for each of the illustrative embodiments of the principles of my invention diagrammatically illustrated in Figs. 11 and 12, it will be apparent that the shuttle passage means H has a predetermined capacity to conduct or flow liquid under pressure therethrough. This liquid flow capacity will, of course, vary as the liquid pressure differential between chambers F and G varies and is determined by the aforesaid size, shape, and number of the passages which constitute the shuttle passage means H. When this has been determined, according to the teachings of my invention, the liquid flow capacity of the shuttle passage means H will thereby be fixed or constant for any given liquid pressure differential and will thereby determine the liquid flow resisting characteristic of the shuttle passage means H in effecting resistance to movement of the shock absorber piston E over its range of velocities incident to normal use of the shock absorber in damping relative movements between the vehicle ground wheel and sprung parts such as the body. Likewise the liquid escape passage means J has a predetermined capacity to conduct or flow liquid therethrough when subjected to a liquid pressure differential between chamber G or G' and the reservoir D and this liquid flow capacity will likewise vary as the pressure differential varies. The liquid flow capacity of the liquid escape means J is likewise determined by the aforesaid size, shape, and number of the passages which constitute the escape passage means J and when this has been determined, according to the teachings of my invention, the liquid flow capacity of the escape passage means J will thereby be fixed or constant for any given liquid pressure differential and will thereby determine the liquid flow characteristic of the escape passage means J in effecting resistance to movement of the shock absorber piston E in the direction of its reciprocatory movement toward the check valve means K and over its range of velocities incident to normal use of the shock absorber.

Because of the inherent characteristic of the shuttle passage means H to restrict flow of liquid between chambers F and G, this passage means H may be said to restrict free flow or escape of liquid therethrough between chambers F and G when piston E reciprocates. This is in sharp contrast with the aforementioned conventional shock absorbers having a pressure relief or check valve associated with one or more conventional liquid conducting passages which are of such large liquid flow capacity as to permit or accommodate free flow of liquid therethrough so that when the valve is open the pressure of the liquid in the conventional rebound chamber is deliberately permitted to substantially equalize with the pressure of the liquid in the conventional compression chamber when the piston stroke is toward the conventional check valve controllingly associated with the liquid reservoir.

The arrangements of compression chamber G and rebound chamber F in Fig. 11 or the compression chamber F' and rebound chamber G' of Fig. 12 may be conveniently encompassed by designating the chamber G or G' without the piston rod 28 as a "first" chamber and the other as a "second" chamber, and the piston E having a movement in "one direction" which unseats check valve 58 (up in Fig. 11 and down in Fig. 12) and a movement in its "other direction" (down in Fig. 11 and up in Fig. 12) which seats this check valve.

In each of the embodiments of my invention, in contrast with conventional shock absorbers, the area of the shuttle passage means H is of such predetermined amount, in proportion to the liquid displaced by reciprocatory movement of the piston, as to provide a liquid flow resisting characteristic which will effect all of the resistance to movement of the piston in its said one direction away from the check valve 58, it being noted that this same area and liquid flow resisting characteristic of the shuttle passage means is presented to the liquid in the first chamber G or G' to restrictively control escape of liquid therefrom to the second chamber F or F" during movements of the piston in its other direction.

It is, of course, a difficult matter to refer with clarity to shock absorber performance on vehicles under conditions of differing ranges of activity. A vehicle travelling at slow speed and encountering an irregularity in the road will result in operation of the shock absorber in its low range as the maximum piston velocity is relatively low but at higher vehicle speeds the same irregularity will result in activation of the shock absorber in its medium or high ranges of activity, the maximum velocity attained by the piston being relatively greater. Furthermore, it is a matter of opinion as to when the shock absorber is operating in its various ranges of performance. Therefore, in order to provide reference terminology which may be readily understood in all instances, I have somewhat arbitrarily selected, for purposes of definitive reference terminology herein, the following definition of range performance of my shock absorber. Thus an irregularity which gives rise to shock absorber strokes inducing maximum piston velocities, relative to the working cylinder in all instances, of up to about .5 feet per second will be termed the low range operation or performance of the shock absorber. Similarly maximum piston velocities up to about 1.3 feet per second are termed intermediate or medium range operation and strokes inducing maximum piston velocities up to about 2.6 feet per second are designated the high range operation. Velocities substantially higher than 2.6 feet per second are, as is well known, often experienced with shock absorbers in conventional vehicle operations but the foregoing values will serve as representative of typical performances of shock absorbers in general and are useful for comparison and reference purposes in defining certain of the novel characteristics of my invention.

I claim:

1. In a hydraulic direct acting shock absorber of the character described comprising in combination, a working cylinder adapted to contain a liquid, a working piston reciprocably fitted to said cylinder, means providing first and second liquid pressure chambers within opposite end portions of said cylinder separated by said piston, a piston rod carried by said piston and extending through said second chamber, means including a tube surrounding and spaced from said cylinder providing a liquid reservoir, and baffle means in said reservoir operating to control surge tendencies of liquid therein, said baffle means comprising a pipe extending spirally between said cylinder and tube and having its ends open to said chambers respectively whereby to conduct liquid between said chambers as an incident to operation of said piston.

2. In a hydraulic direct acting shock absorber of the character described comprising in combination, a working cylinder adapted to contain a liquid, a working piston reciprocably fitted to said cylinder, means providing first and second liquid pressure chambers within opposite end portions of said cylinder separated by said piston, a piston rod carried by said piston and extending through said second chamber, means providing a reservoir for liquid adjacent one end of said first chamber, a liquid escape pipe having one end thereof so disposed as to be continuously open to the liquid in said first chamber, said pipe being return-bent and extending from said end within said reservoir, the other end of said pipe being so disposed as to be continuously immersed in the liquid in said reservoir and being directed away from the liquid level in said reservoir, said pipe having predetermined length and cross-sectional area for effecting predetermined resistance to liquid flow therethrough, and means controlling flow of liquid from each of said chambers to the other.

3. In a hydraulic shock absorber of the character described comprising, a working cylinder and a piston reciprocable therein, means providing a pair of liquid chambers within said cylinder respectively on opposite sides of said piston, a liquid reservoir, means providing restricted liquid escape from each of said chambers when the volume thereof is diminished by operation of said piston relative to said cylinder, said escape means comprising a liquid shuttle tube extending spirally around said cylinder and having its ends respectively open to said chambers, and a second tube open at one end to one of said chambers and having its other end open to said reservoir, said second tube extending spirally around said cylinder between convoluted portions of said shuttle tube.

4. In a direct acting hydraulic shock absorber of the type having a working cylinder closed at one end through which a piston rod extends for operable connection with a working piston reciprocably mounted in said cylinder to provide a rebound chamber adjacent said closed cylinder end and a compression chamber adjacent the other cylinder end, a tubular member surrounding said cylinder to provide a liquid reservoir, and check valve means between said compression chamber and said reservoir having a relatively large unrestricted liquid flow capacity sufficient to accommodate free liquid flow from said reservoir to said compression chamber during the rebound stroke of said piston towards said closed cylinder end; liquid transfer means resisting flow of all liquid that is passed between said compression and rebound chambers and from said compression chamber to said reservoir, said liquid transfer means comprising liquid flow restricting escape passage means operative to restrict liquid flow from said compression chamber to said reservoir and liquid flow restricting shuttle passage means operative to restrict liquid interflow between said chambers on both the compression and rebound strokes of the piston to thereby cause the piston to perform useful resistance work on both strokes of said piston, said shuttle passage means having constantly open communication between said compression and rebound chambers through aperture means having constantly open communication with the rebound chamber and through aperture means having constantly open communication with the compression chamber, all of the liquid discharged from said rebound chamber during all rebound piston strokes flowing only to said compression chamber and passing through the first said aperture means and all of the liquid flowing from said compression chamber to said rebound chamber during all compression piston strokes passing through the second said aperture means, said shuttle passage means having such liquid flow restricting capacity relative to the liquid flow restricting capacity of said escape passage means that only a minor portion of the compression resistance work during the compression stroke of the piston is effected by the flow resistance offered by said liquid escape passage means and the major portion of the compression resistance work is effected by the flow resistance offered by said shuttle passage means.

5. In a direct acting hydraulic shock absorber of the type having a working cylinder closed at one end through which a piston rod extends for operable connection with a working piston reciprocably mounted in said cylinder to provide a rebound chamber adjacent said closed cylinder end and a compression chamber adjacent the other cylinder end, a tubular member surrounding said cylinder to provide a liquid reservoir, and check valve means between said compression chamber and said reservoir having a relatively large unrestricted liquid flow capacity sufficient to accommodate free liquid flow from said reservoir to said compression chamber during the rebound stroke of said piston towards said closed cylinder end; liquid transfer means resisting flow of all liquid that is passed between said compression and rebound chambers and from said compression chamber to said reservoir, said liquid transfer means consisting of liquid flow restricting escape passage means operative to restrict liquid flow from said compression chamber to said reservoir and liquid flow restricting shuttle passage means having constantly open communication between said compression and rebound chambers and operative to restrict liquid interflow between said chambers on both the compression and rebound strokes of the piston to thereby cause the piston to perform useful resistance work on both strokes of said piston, said shuttle passage means having such liquid flow restricting capacity relative to the liquid flow restricting capacity of said escape passage means that only a minor portion of the compression resistance work during the compression stroke of the piston is effected by the flow resistance offered by said liquid escape passage means and the major portion of the compression resistance work is effected by the flow resistance offered by said shuttle passage means.

6. A shock absorber according to claim 4, in which the cylinder has an inside diameter of approximately one inch and the piston rod has an outside diameter of approximately one-half inch and wherein, for any given piston velocity, the shuttle passage means offers a flow resistance substantially equal to that of a tubular conduit having an inside diameter of .1275 of an inch and a length of approximately twenty inches and the escape passage means offers a flow resistance substantially equal to that of a tubular conduit having an inside diameter of .065 of an inch and a length of approximately twenty inches.

HERMAN C. CUSKIE.

References Cited in the file of this patent

UNITED STATES PATENTS

| Number | Name | Date |
|---|---|---|
| 823,567 | Waters | June 19, 1906 |
| 2,004,380 | Nickelsen | June 11, 1935 |
| 2,362,870 | Ward | Nov. 14, 1944 |
| 2,445,407 | Rossman | July 20, 1948 |
| 2,546,038 | McIntyre et al. | Mar. 20, 1951 |